United States Patent [19]
Mayo

[11] 3,874,531
[45] Apr. 1, 1975

[54] CART AND VEHICULAR CARRYING SYSTEM FOR THE CART

[76] Inventor: William D. Mayo, Green Glade Rd., Phoenix, Md. 21131

[22] Filed: Mar. 21, 1974

[21] Appl. No.: 453,415

[52] U.S. Cl............ 214/130 R, 280/47.35, 280/79.2, 280/179 R
[51] Int. Cl................................................. B65f 3/02
[58] Field of Search...... 214/130 R, 77 P, 145, 450, 214/454; 280/179 R, 47.35, 79.2; 224/29 R; 312/250

[56] References Cited
UNITED STATES PATENTS
| | | | |
|---|---|---|---|
| 3,312,361 | 4/1967 | Foster | 214/145 |
| 3,695,469 | 10/1972 | Arant | 214/450 |
| 3,730,365 | 5/1973 | Herpich | 214/130 R |
| 3,732,997 | 5/1973 | Reavis | 214/130 R |

*Primary Examiner*—Robert R. Song
*Attorney, Agent, or Firm*—John F. McClellan, Sr.

[57] ABSTRACT

A vehicle carried utility push-cart system in which a basic cart configuration has handle and a forebody both telescoping into a wheeled or ski-supplied midbody which has a pan as the primary load carrying element of the cart; the pan has a laterally outboard torque tube socket which engages a hook in a vehicular attachment jacking system permitting the cart to be loaded on the rear of and transported by the vehicle; a double hook embodiment, and various specialized embodiments for use in camping, picnicking and as artisans' carts, are disclosed.

53 Claims, 46 Drawing Figures

CART AND VEHICULAR CARRYING SYSTEM FOR THE CART

This invention relates generally to land vehicles and specifically to special utility carts adapted for carriage by motor vehicles.

Principal objects of the present invention are to provide a versatile utility cart or caddy, which preferably is termed "DADDY CADDY" from the many household and industrial functions it performs with little adaptation, and which has a special attachment mechanism for vehicular loading and carriage. The various features to be described are largely universally applicable to the various embodiments.

Very importantly, the invention includes between the cart and carrying vehicle rigid attachment which is angularly adjustable, which has inherently a shock cushioning spring action, and which permits the load center of gravity to be adjusted about the carrying vehicle longitudinal centerline.

More specific advantages found by the inventor include the following:

"This universal unit is extremely handy as a space saver on cars, trucks, campers and the like. It adds weight in the rear of cars and trucks for better traction. It allows heavy loads to be handled easily. Carpenters, mechanics, plumbers, etc., can haul all of their tools to the site of the job in it, easily remove it from vehicles, use at job, remove from job and take home and put away without worry of theft, or simply lock the unit in place on car. Campers, bathers, picnickers and others can have the same advantages as above, saving space in the car, on top, and in the trunk. One of the outstanding advantages is that most articles can be stored inside the Daddy Caddy until needed. When going camping or to the beach where there may be a long haul, the whole load can be carried at one time instead of being carried in two or three trips. Women can easily lift equipment in it onto the car and safely lock it there. Appropriate safety reflectors, slogans and warning tags are easily put on the units."

In brief summary, given for cursive description only, the invention includes a cart with handle and forebody extensible from a midbody having wheels or other ground supporting members, a pan for stiffening and load carrying, with a double ended laterally spaced fore-and-aft disposed securances for attaching the handle behind and the forebody which also is provided with a ground supporting member in front and load carrying means, and a vehicle attachment including a cart engaging articulated system.

The above and other objects and advantages of the invention will be more readily understood on examination of the following description, including the drawings in which similar reference numerals indicate similar parts:

Figure 1:
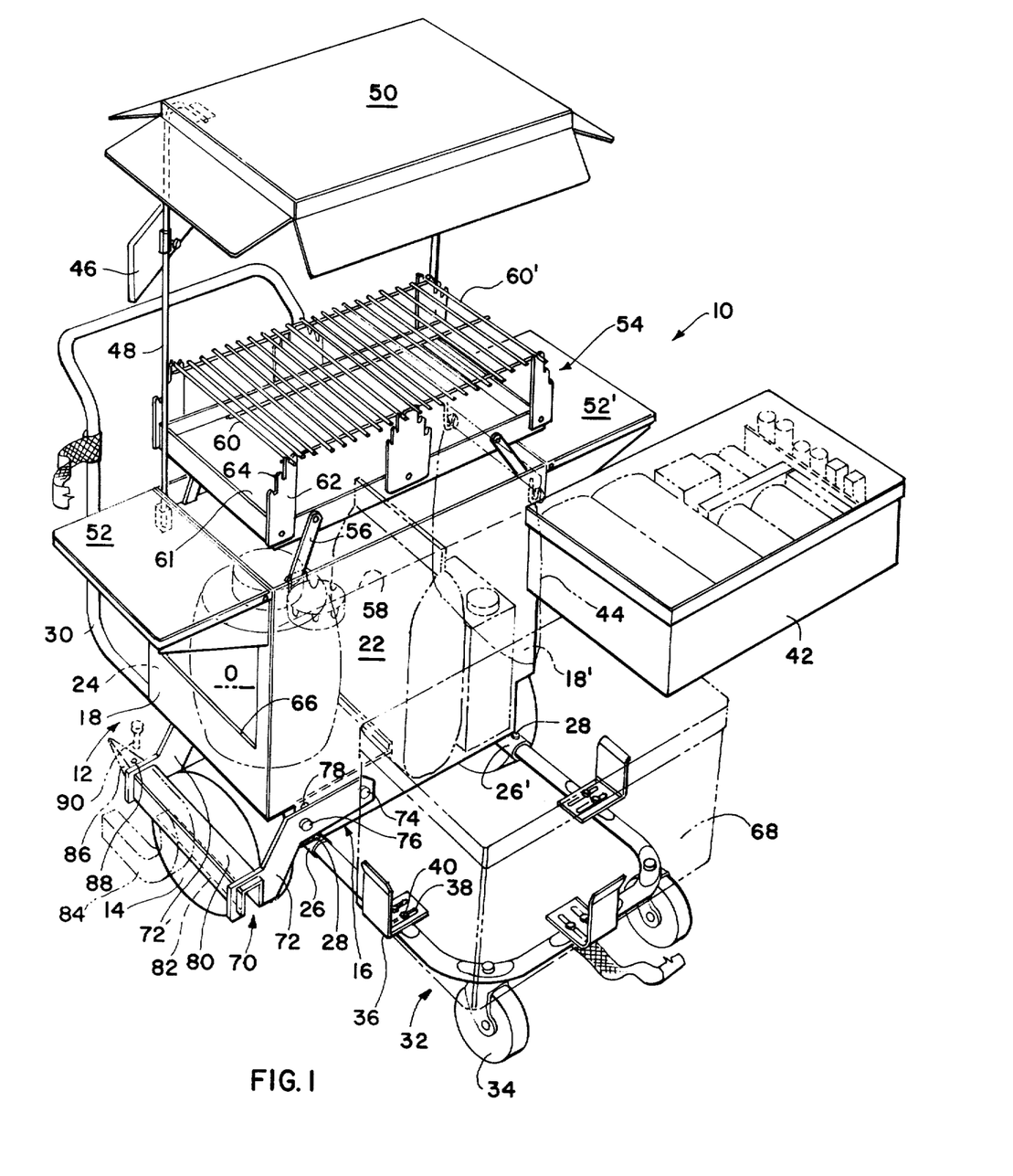
FIGS. 1, 2 and 3 are isometric views.
Figures 2, 3, 4:
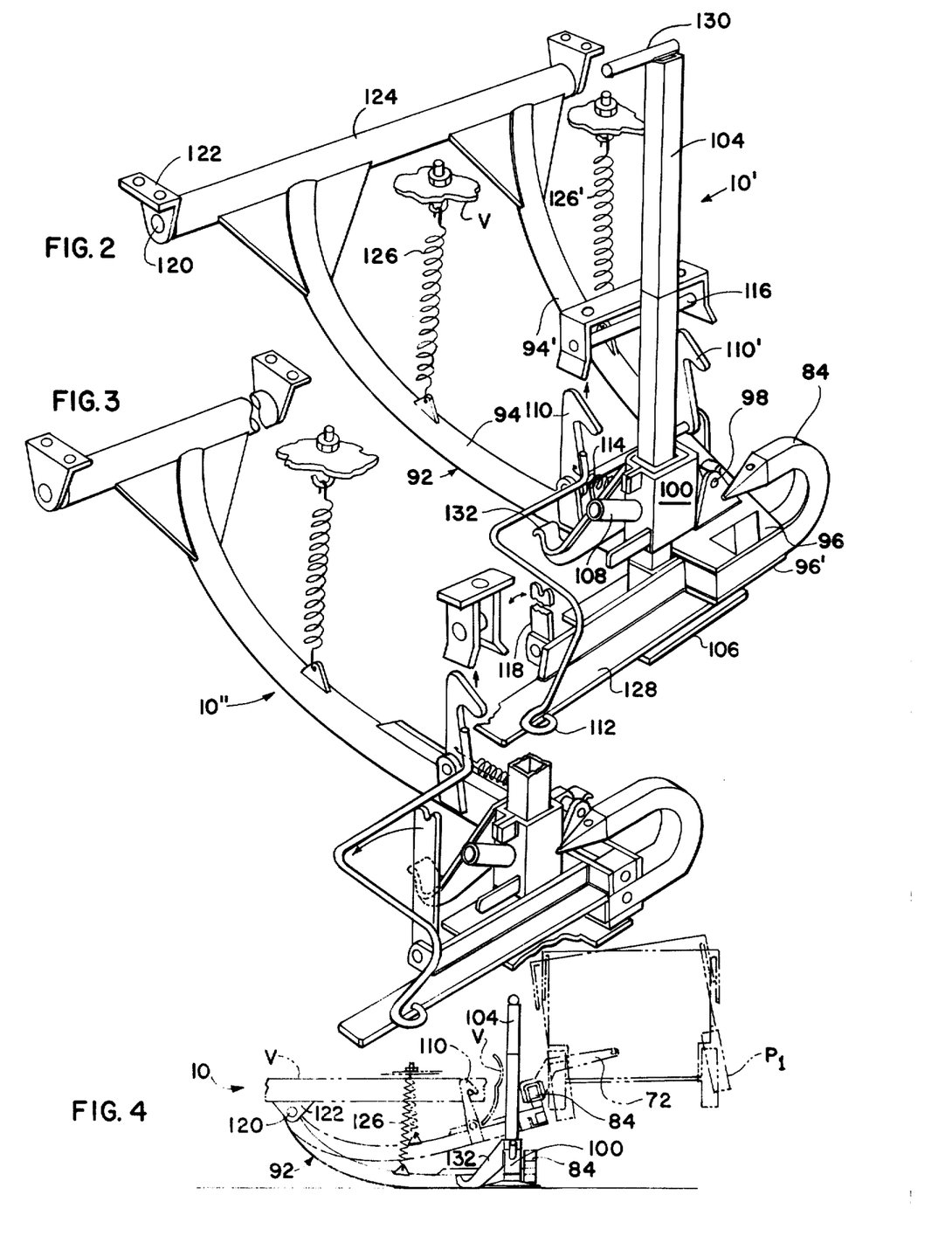
FIG. 4 is a side elevation diagram.

FIGS. 1 and 2 show the general form and relations of the parts of the invention, which comprise generally a utility cart 10a (FIG. 1) and a special attachment 10b for securing the cart to a carrying vehicle, as to the rear of an automobile.

GENERAL DESCRIPTION OF A CART EMBODIMENT

The cart embodiment 10 comprises a midbody 12 having a pair of supporting wheels 14 for mobile ground-support, a pan 16 having the form of a rectangular box with sidewalls 18, 18' and forward and back walls 22, 24; the upper portion preferably overhangs the wheels laterally. Welded to the pan on each side in fore-and-aft position and preferably co-extensive at least with the length of the pan is a double-ended securance in the form of a tube 26, 26' having a setscrew 28 at each end. Slidably telescoped within the tubes 26, 26' at the rear are the ends of a U shaped handle 30 which extend back and then up, forming a rack space between the handle and the midbody. A U shaped forebody 32 having castor supports 34 at the forward side portions and L shaped clips 36 adjustably held by longitudinal slots 38 therein and bolts 40 slidably telescopes within the tubes 26, 26' at the front end. Storage box 42 of any reasonably size on the forebody is a useful option, as well as trashbag 44 and mirror 46. A rod 48 supports metal canopy 50 above the pan; the canopy is a box-top having downturned sides, and is proportioned to serve as a lid for the pan when collapsed for carrying or storage. Leaves 52, 52' supported by triangular struts extend horizontally to the sides for use and fold downward for transport. A grill 54 having folding feet 56 spaced to rest on horizontal partition 58 in the pan in stabilizing contact with the front and rear walls thereof has a two-part grid 60, 60', a tray 61, a plurality of vertical pivotal-plates 62 having stepped notches 64 therein spaced to support the grids adjustably upward or downward in parallel increments in successive sets of the notches. At least one wall has an access aperture 66 for internal storage of objects O. A clip-held forebody 68 rests in front, if desired alternatively or together with storage box 42.

PROVISIONS FOR VEHICULAR CARRIAGE OF THE CART

The cart has bolted to the rigid pan of the midbody 12 thereof a bracket 70 having perforated forward and rearward flanges 72, 72' adjustably affixed to respective walls 22, 24 of the midbody of the cart by means of a pivot bolt 74 and an adjusting bolt 76 engaging one of a series of holes 78 arranged in an arc about the pivot bolt location.

A rectangular-section tube 80 is affixed as by welding to the flanges in fore-and-aft disposition relative to the cart. The bottom of the rectangular-section tube has a slot 82 extending from one end to a position intermediate the length.

A hook 84 (phantom lines) having a complementary cross-sectional shape to the rectangular-section tube, and proportioned to make a tight fit in it, engages it. The hook has a tapered end 86 with a hole 88 vertically through it for a pin 90 which retains the hook in place on assembly. The body of the hook extends horizontally then curves downward and extends horizontally to meet the hook support structure, which completes the means for vehicular attachment.

FIG. 2 shows the means for vehicular attachment in preferred embodiment 10'. A pivot arm assembly 92, preferably comprising two upwardly concave tubes 94, 94' is joined at a first end by sandwiching upper and lower plates 96, 96' which also sandwich the lower portion of the hook 84 to support the hook. A pivot 98 on the top plate supports a jack body 100. The rack 104 of the jack is held substantially vertically and has a foot plate 106 at the bottom. The handle portion 108 extends parallel with the hook. Paired latches 110, 110' pivoted to the pivot arm to hold it upward are retractable by an extension 112 against the tension of a spring 114, disengaging them from a latch bar 116 which is bolted or otherwise affixed beneath the rear of an automobile in typical installation. Preventer 118 latches the extension up. A pivot axle 120 at the forward or second end of the pivot arm secures to the vehicle by a bracket 122 at each end and pivotally supports pivot sleeve 124 which unites the pivot bar tubes. Bias springs 126, 126' connected between the pivot arm and vehicle V urge the pivot arm upward. Step plate 128 provides means at the first end of the pivot arm for forcing it downward against the bias of the spring. Lift bar 130 at the top of the jack rack provides means for raising the rack manually.

A lift-hook 132 extends from the body of the jack and hooks upward in position to engage the bottom of a vehicle bumper.

FIG. 3 illustrates a light duty embodiment 10" of the FIG. 2 device, similar in all respects except having a single arm and latch.

On installation, the flanges are adjusted to fit the ends of the rigid, strengthening midbody pan at the appropriate angle with the pivot arm in the down position and the hook engaged.

The center of gravity of the cart relative to the longitudinal centerline of the load carrying attachment is adjustable by extending or collapsing the telescoping engagements of the handle and forebody and loading them appropriately.

The hook and socket or female torque tube impart a desirable shock resisting springiness to the load carrying structure.

FIG. 4 illustrates two positions of operation of the assembly. In operation the utility cart collapsed on itself in carrying position, is rolled past the hook a distance engaging it fully in the socket, the hook pin is inserted, securing the hook in place; and the jack is then actuated, lifting the utility cart from the ground to one of the phantom positions shown; depending on installation angle, the utility cart may be (and preferably is) tipped as shown at P1, giving additional clearance behind the carrying vehicle.

Figure 5:
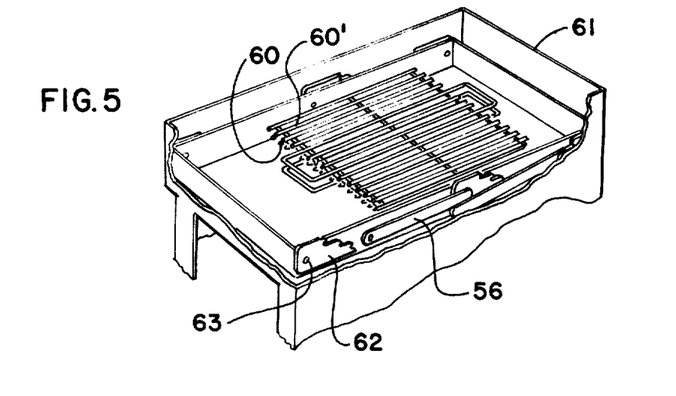
FIG. 5 is an isometric detail.
Figure 6:
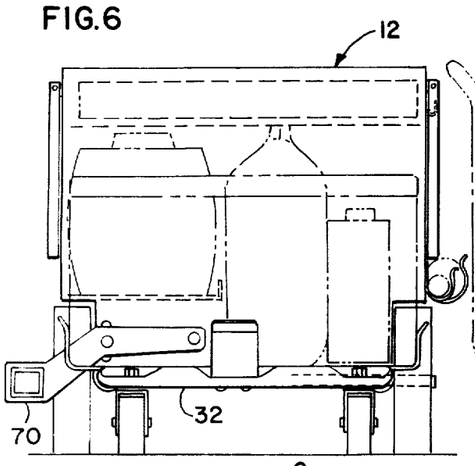
FIG. 6 is a front elevation.
Figure 7:
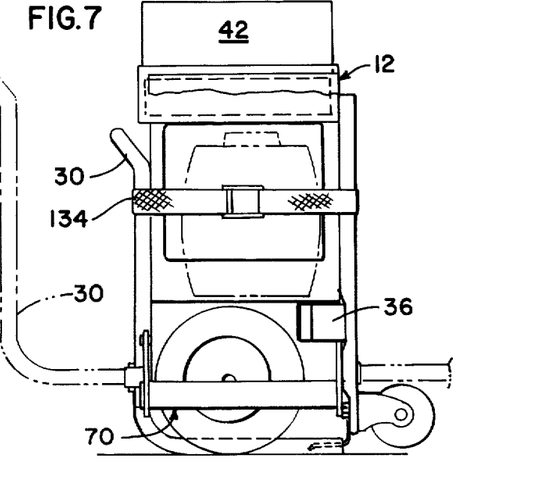
FIGS. 7 and 8 are side elevations.

FIGS. 5, 6 and 7 show the collapsed-for-transport arrangements of the preferred embodiment. In FIG. 5 the tray 61 and the grid portions 60, 60' are set inside the feet 56, the stepped plates 62 being folded by pivoting about securing bolts 63 in the sides. In the progressive folding stages of FIG. 6 and FIG. 7, the U handle 30 and forebody 32 are removed and held compactly nested against the midbody 12 by a strap 134, the clips 36 being spaced to grasp the midbody. A forebody box 42, FIG. 7, can be rested on the flat top of the assembly when collapsed for transport. Bracket 70 compactly frames the folded configuration in operating position.

Figure 8:
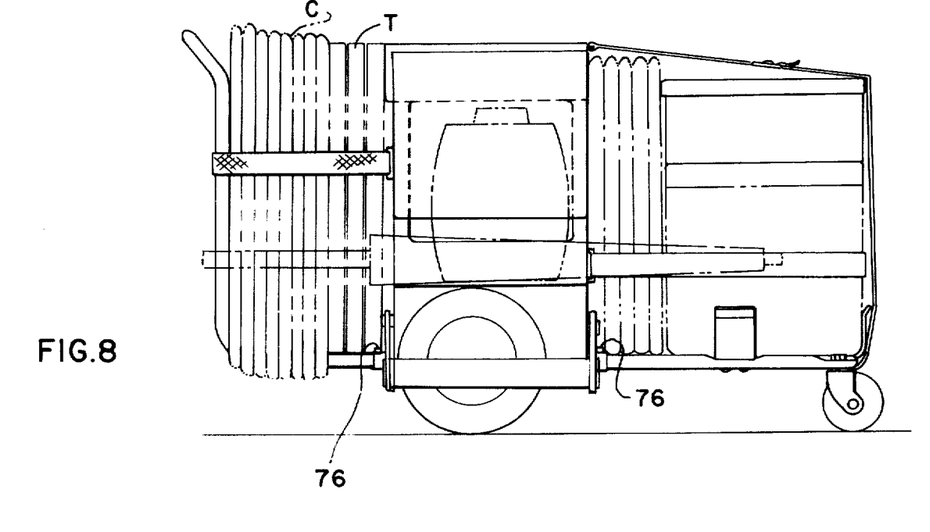

FIG. 8 shows a transport or storage arrangement in which the handle and/or the forebody can be extended away from the midbody by extending the telescoped ends from the midbody tubes by loosening setscrews 76 and retightening after extending. Folding chairs C, folding tables T and the like can be securely racked in the spaces provided. Objects such as lawn umbrellas can be carried in circular clips provided for the purpose.

Figure 9:
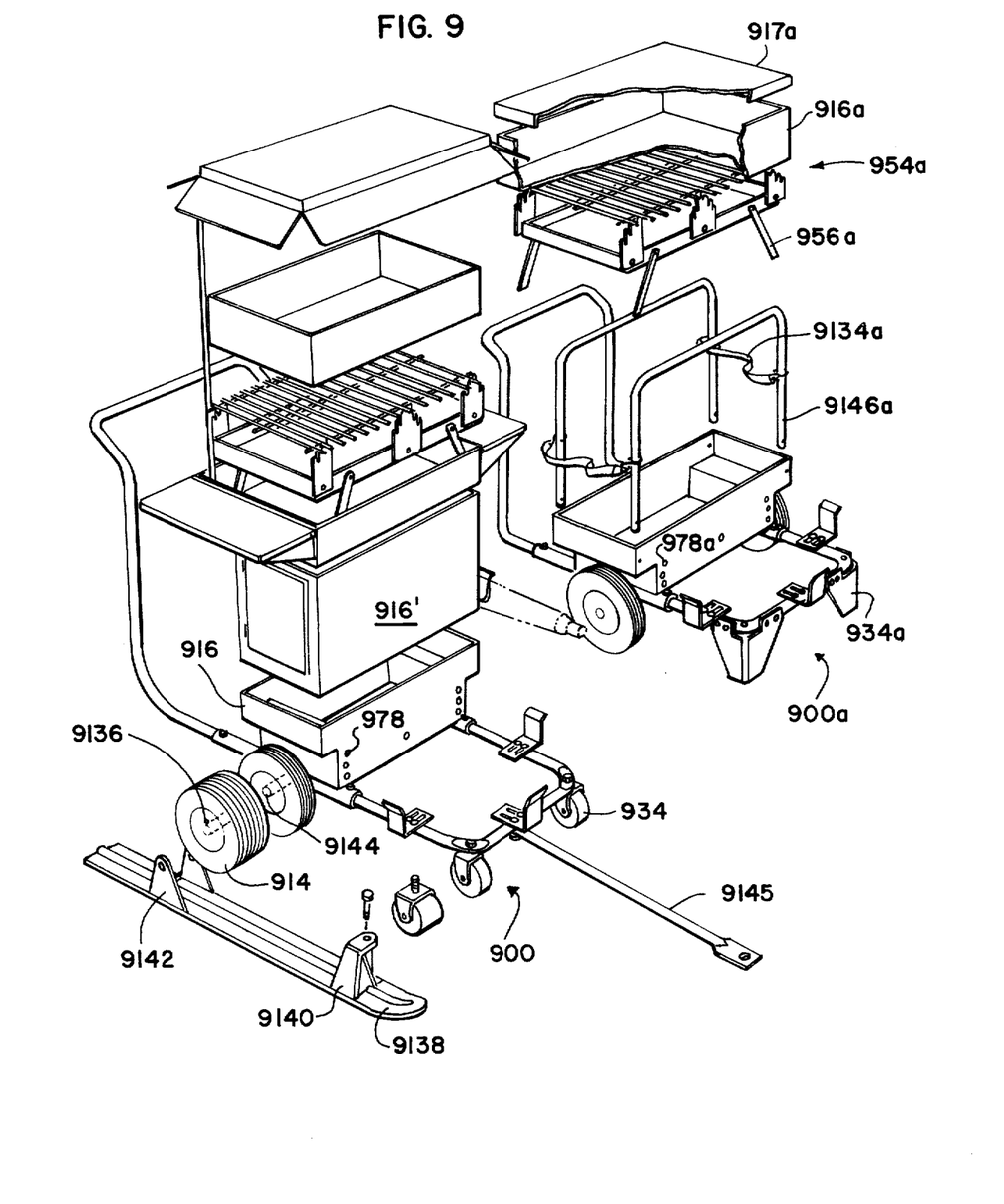
FIGS. 9 – 24 are isometric views.

FIG. 9 illustrates comparative embodiments 900 and 900a, showing the ease of adaptation of the preferred basic unit from one use to another. Attachment of the socket assembly can be on either side by means of holes 978. Embodiment 900 is similar to previously described embodiment 10, except that the upper portion 916' of the pan is removable so that it may be employed separately, as for a Dutch Oven. Large (sand) wheels 914 are easily substitutable, employing screw fasteners 9136 which fix the wheels on the axle. Skis 9138 have forward upstanding attachments 9140 which receive bolts through the holes in the forebody the shanks of castors 934 employ, when the castors are removed. The pair of rearward upstanding attachments 9142 receive the axle 9144 and are retained by screw 9136 in similar manner to the wheels, quick change throughout being provided. A towing handle 9145 on the forebody is a useful option.

Embodiment 900a is shown as a wood carrier, luggage carrier, etc., having one or more pipe racks 9146a formed as inverted U's attachable in the pan, and equipped with straps 9134a. To prevent sliding on slopes and the like, the forebody is equipped with corner-feet 934a, downward sheet metal plates bent about a vertical axis to form a corner and bolted into the forebody sides at the forward corners. A grill 954a can be employed with this embodiment also, the feet 956a being strapped against the pipe racks. A Dutch Oven may be provided as at 916a'; may have a light metal lid 917a.

Figure 10:
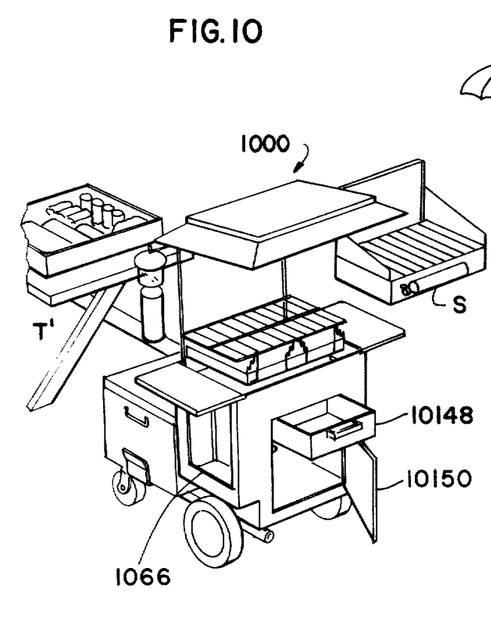
Figure 11:
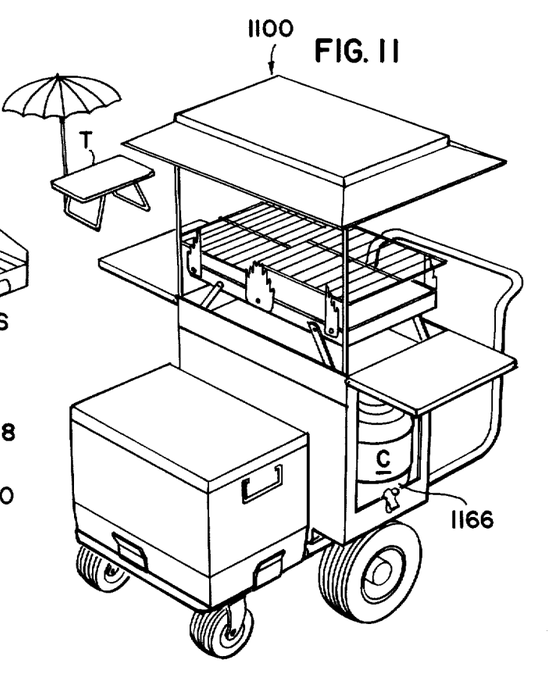

FIGS. 10 and 11 show other features in light duty and heavy duty or beach service embodiments 1000, 1100 similar to previously described embodiments 10 and 900. Drawer 10148 and rear door 10150 are easily accessible, particulary when the handle is removed as shown in FIG. 10, making the unit even more compact and easy and safe to work around in crowded camping or lawn areas where tables T', and T, both of the on-site and of the caddy carried variety, may be close by. A camping stove S may be substituted in place of the grill at anytime.

Both left and right-side openings 1066 and 1166, may be used, making beverage dispensing as from container C easier on the off side, as opposed to the hook engagement side.

Figures 12, 13:
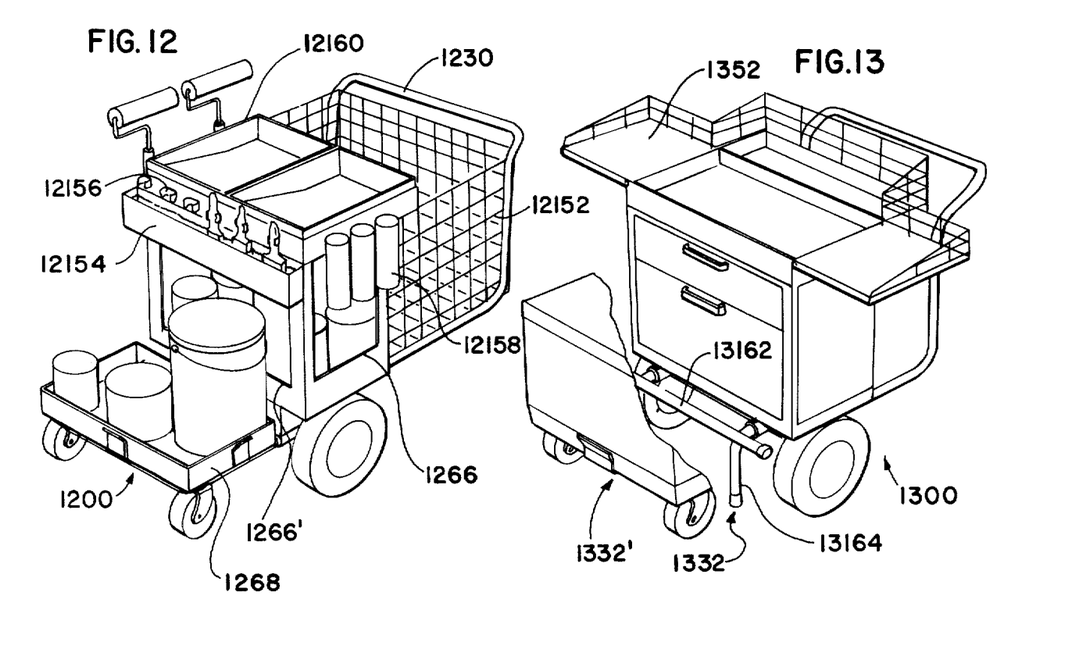

FIG. 12 illustrates a painter's cart embodiment 1200 having a forebody pan 1268 open at the top, a drop cloth bin in the form of a basket 12152 carried behind in the rack-space between the handle 1230, which is rearwardly extended, and the midbody. The midbody has openings 1266, 1266', giving side and front access to the contents, a trough 12154 for solvent with brush clips 12156 in position above it on the upper front of the forebody, roller handle sockets 12158 for roller storage, and paint pans 12160 of the roller type at the top.

FIG. 13 shows a bar cart embodiment 1300. Ice is held in forward drawers, together with bottled goods. The top has hinged folding leaves 1352 and the forebody 1332 comprises a bar rail 13162 supported on downturned tubular feet 13164, the upper ends of which have tubular engagement with the midbody as previously described. This makes for closer access to the forward part of the cart than with the usual load-carrying forebody, indicated at 1332', and prevents the cart from rolling. This embodiment may have the handle pushed against or secured to a wall or tree for greater stability.

Figure 14:
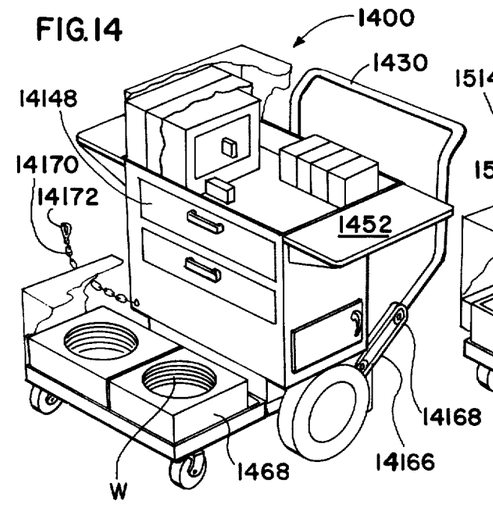

FIG. 14 shows a cart embodiment 1400 especially adapted for electrician's use, with a forebody pan 1468 for containing coils of wire W, drawers 14148, leaves 1452, extending the top, and a handle having a stairway traverser in the form of traction members or endless-belt rolls 14166 on the lower portions of the handle 1430, which extend diagonally upward from the midbody. A portion of the endless belt lies below the handle, and anti-friction pulleys 14168 mount the endless belts to the handles in the conventional manner of such devices. In this and other embodiments an anti-theft case hardened chain 14170 and lug 14172 can be provided for locked attachment to a stationary object.

Figure 15:
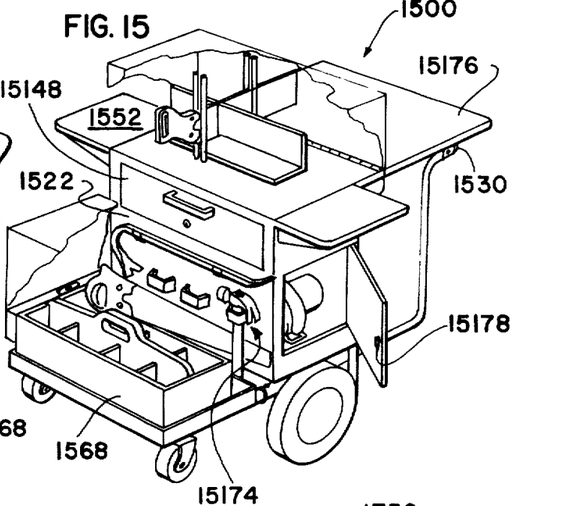

FIG. 15 shows a carpenter's cart embodiment 1500 with toolbox 1568 on the forebody, tool rack 15174 on the midbody forward wall 1522, drawer 15148 and particularly a table surface extension 15176 having an edge which screws to or hinges on the midbody and which has the cantilevered part resting on the handle 1530 for support, extending rearwardly the surface already extended laterally by leaves 1552. Locks 15178 on the storage portions are preferably employed in this and other artisan's models.

Figure 16:
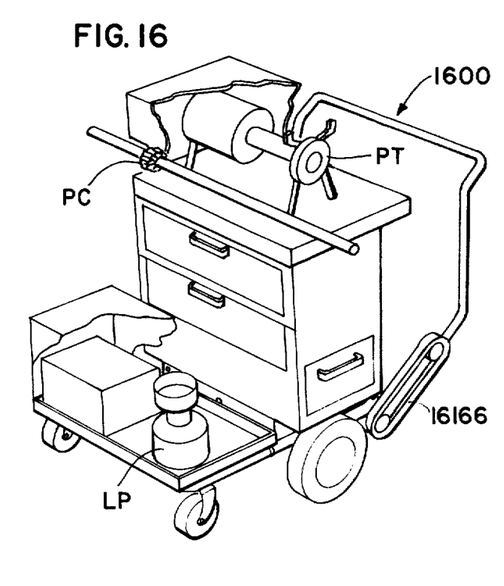

FIG. 16 illustrates a cart embodiment 1600 for use by plumbers, having space for pipe threaders PT, Pipe clamp PC, and having provision for enclosing lead pots LP or furnaces with metal cover after use to prevent injury from heat during transport. A stair traverser 16166 is provided also.

Figure 17:
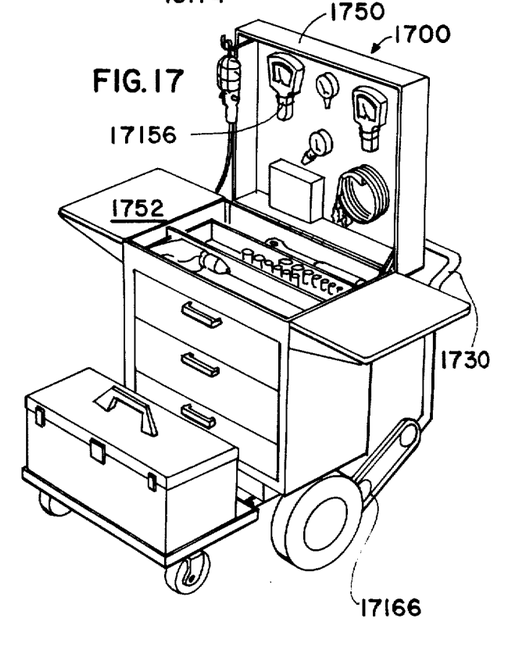

FIG. 17 shows an auto mechanic's cart embodiment 1700 having a lid 1750 which hinges open to an upright position, disclosing clips 17156 for test instruments; the mid-body is substantially similar to mechanic's tool-boxes, but with lateral leaves 1752. The handle 1730 has a stairway transporter 17166 preferably.

Figures 18, 19, 20:
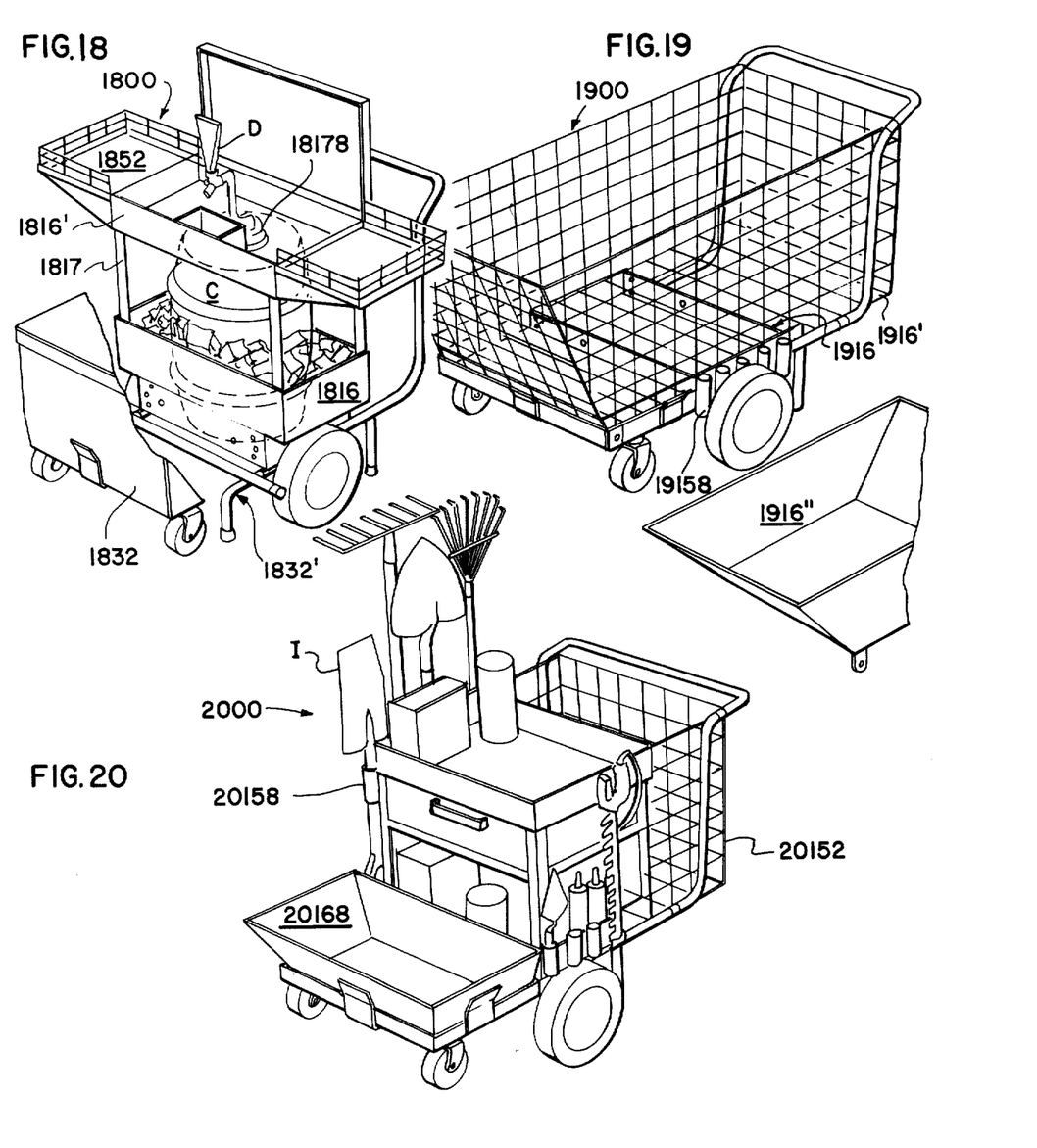

FIG. 18 shows a further bar cart embodiment 1800. The pan 1816 has plural struts 1817 extending upwardly and supporting a tray 1816' above the pan: the tray has an aperture 18178 passing the dispensing apparatus D of a beer keg C or other container held in an ice bed in the pan. The leaves 1852 serve as glass racks. The forebody is similar to that described in references to FIG. 12. A substitute forebody 1832 can be plugged into the midbody in the usual way, carrying the supplies, such as ice, glasses, etc., usually needed at the site, and then removed and substituted by the bar rail forebody 1832' to give closer access to the midbody.

FIG. 19 shows a bulk carrier embodiment 1900 having an elongate rectangular or boxshape body in the form of a leaf bin or basket 1916' extending from the handle forward to the front of the forebody. Leaves can be carried or spent paper cups or the like accumulated and transported. Rakes or paper spears can be stored in the sockets 19158 provided in the pan 1916. Alternatively, a long open-top mortar box or tray as at 1916' can be carried by the cart: In either case pan 1916 is low and simple in shape, without the side overhang.

FIG. 20 illustrates a gardening embodiment 2000 having a basket 20152 behind, a tray 20168 on the forebody, and sockets 20158 for implements I.

Figure 21:
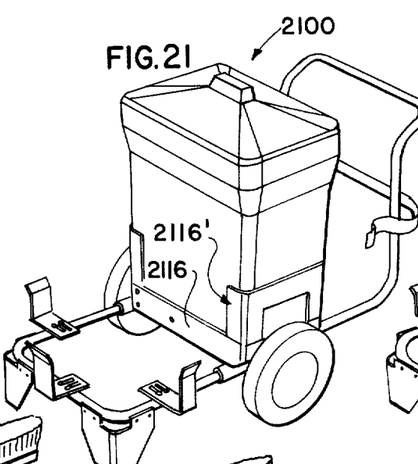

FIG. 21 illustrates a garbage can cart embodiment 2100 basically similar to embodiment 900a described above, but with upward anti-tip extensions 2116' holding the garbage can. A simple pan 2116, as shown, may be used rather than the T shape with side overhangs described in reference to most previous embodiments, with the anti-tip extensions welded or clipped on. This model can serve as an economical grill cart, all supplies being carried inside the garbage can.

Figure 22:
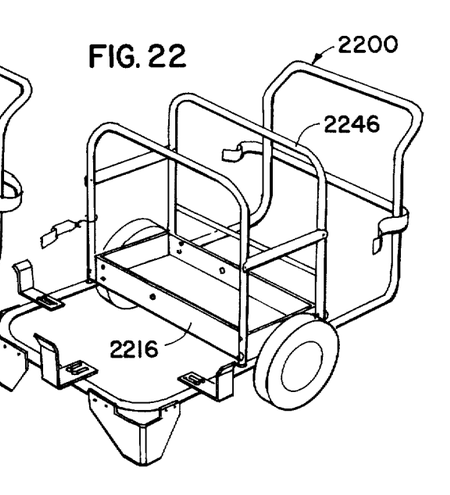

FIG. 22 shows a luggage or wood or garbage can cart embodiment 2200 similar to embodiments 900a and 2100, with pipe racks 2246 bolted to the outside of the simple pan 2216. This is the most economical embodiment, and as noted earlier, can be used for mounting a grill.

Figure 23:
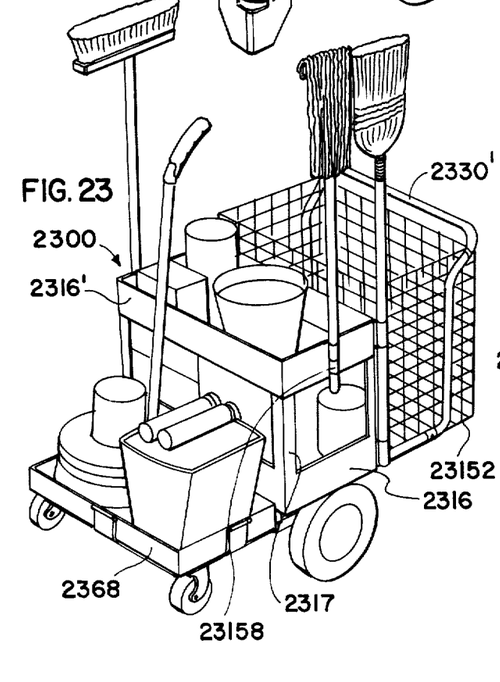

FIG. 23 illustrates a janitorial cart embodiment 2300 having a basket 23152 held between the handle structure, leaving room for gripping the transverse bar 2330' of the handle; and with broom sockets 23158 on the midbody, struts 2317 spacing upper and lower midbody pan and tray 2316, 2316', and a forebody tray 2368.

Figure 24:
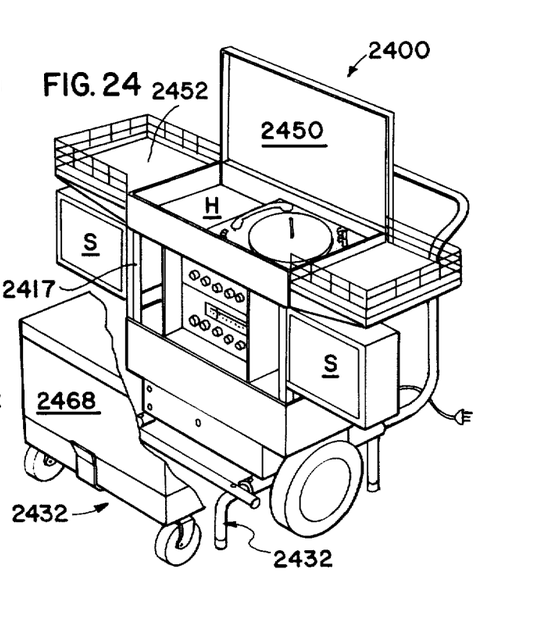

FIG. 24 shows a hi-fi H embodiment 2400 of the cart, having the general configuration of the bar carts previously described, but with a hinged top 2450 on the midbody. Speakers S can be clipped to the sides of the struts 2417 and a substitutable forebody 2432' having a case 2468 can be employed in place of the bar rail forebody 2432. Leaves 2452 give extra space for record handling.

Figure 25:
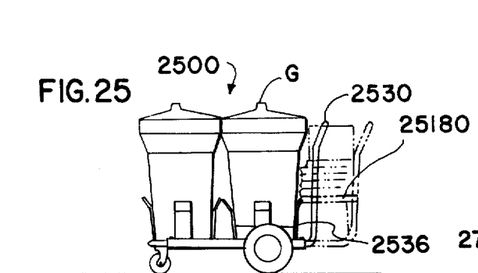
FIGS. 25 and 26 are side elevations.
Figure 26:
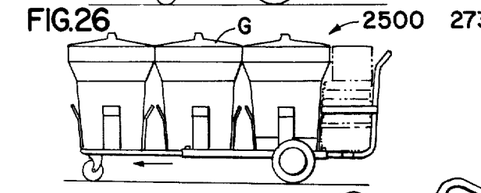

FIGS. 25 and 26 show in two arrangements a garbage can cart embodiment 2500. Normally holding two cans G, the cart when extended holds three cans, and with the handle 2530 extended supports a shelf 25180 between the handle and can clips 2536 for carrying stacked newspapers and the like.

Figure 27:
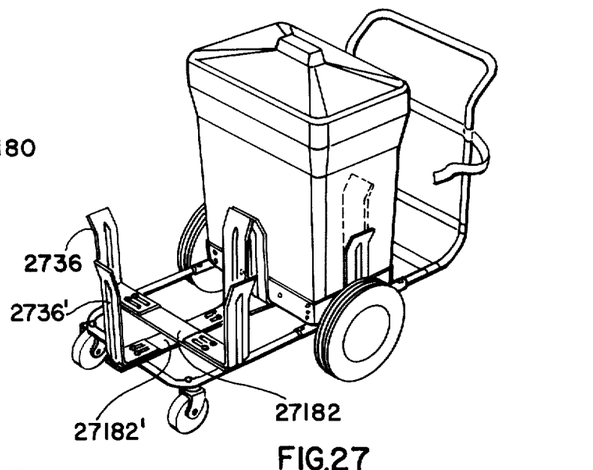
FIG. 27 is an isometric view.
Figures 28, 29, 30, 31:
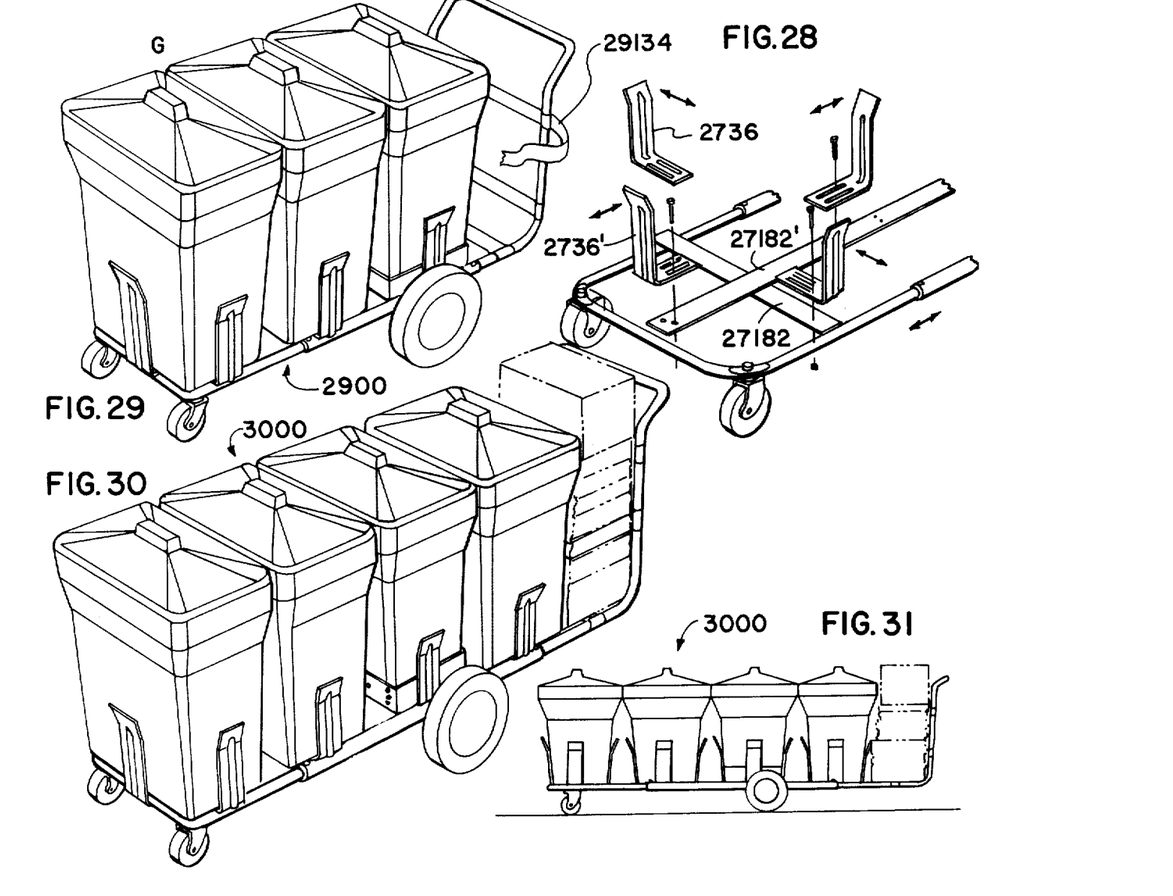
FIG. 28 is an isometric exploded detail.
FIGS. 29 and 30 are isometric views.
FIG. 31 is a side elevation.

FIGS. 27 and 28 illustrate the preferred forebody cross struts 27182, 27182' connecting between opposed L clips 2736 transversely and 2736' fore and aft, to support garbage cans; either strut may be in the upper position, as indicated.

FIG. 29 and FIGS. 30 and 31 are views of three can and four can embodiments 2900 and 3000 of the invention. Straps 29134 across the handle provide extra load carrying capacity.

Figure 32:
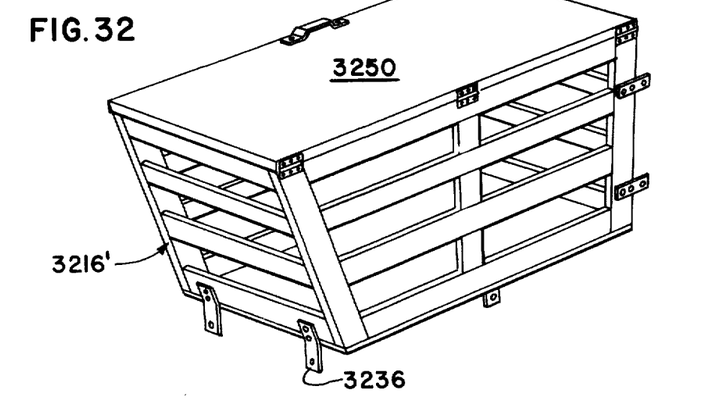
FIGS. 32 and 33 are isometric views.

FIG. 32 shows a detail of an embodiment having an elongated slotted box body 3216' with a hinged top 3250, for use as a collapsible portable crib. It may alternately be used for carrying animals such as dogs, and is attached by clips 3236 to a cart frame such as that shown in the following Figure.

Figure 33:
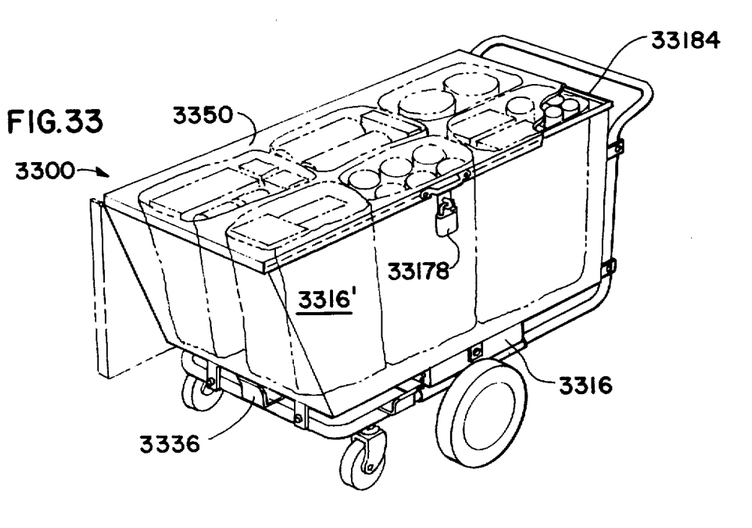
Figures 34, 35:
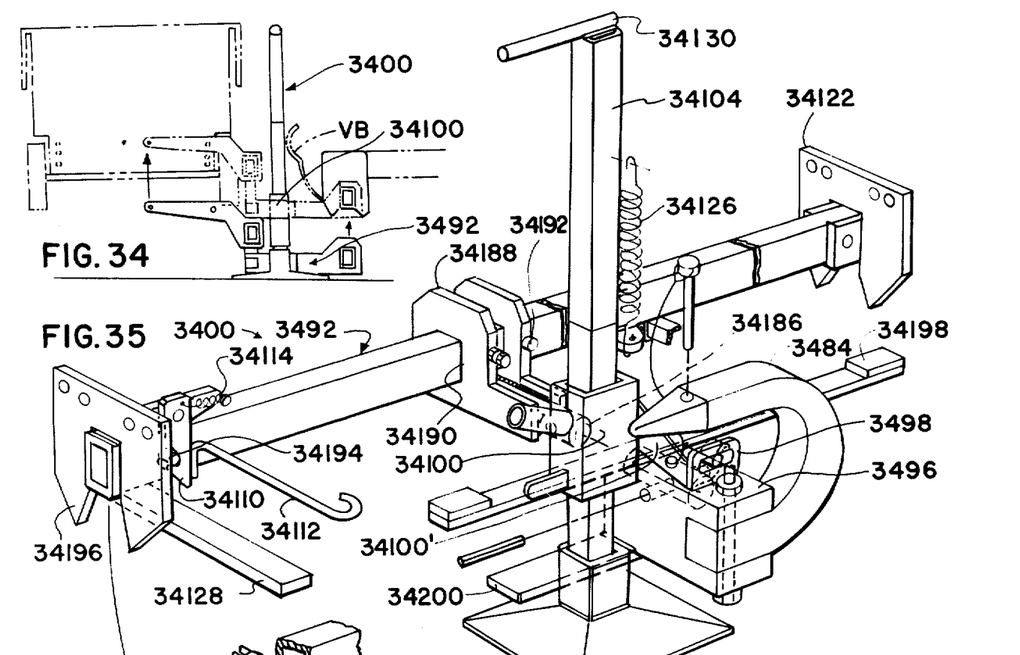
FIG. 34 is a side elevation detail.
FIG. 35 is an isometric view.

FIG. 33 shows an elongate waterproof grocery box embodiment 3300. Solid panel box 3316' has a cover 3350 hinged to it and a rubber gasket 33184 around the rim for weather sealing by cover. Clips 3326 attach the box to the cart by bolts. The body rests on top forebody L shaped clip 3336 and on top the midbody pan 3316. A hasp lock arrangement 33178 can be used to secure the cover. In any of the embodiments a hasp lock can be used to secure the hook pin in place also.

FIGS. 34 – 37 illustrate a further embodiment 3400 of the vehicle mounted jacking and cart transport assembly.

Pivot arm 3492 in this embodiment swings parallel with the plane of the hook 3484 instead of transverse to it as before. Jackbody 34100 is attached to the pivot arm by means of a slotted lug 3498 on block 3496 which bears the hook through pin bearing extension 34100' from the jack. Block 3496 has a pivot axle 34186 connection with a paired-arm journal 34188 which has an opening 34190 through it securing it to the pivot arm in the opening. Screws 34192 lock the paired arm journal to the pivot arm. One end of the pivot arm has a pivotal bracket 34122 for attachment to a vehicle, such as beneath the rear body of an auto to the bumper brackets. The other end has a protrusion 34194 which in the up-position engages a latch 34110 attached to a guide plate 34196 which in turn is bolted or otherwise secured to the vehicle. A spring 34126 urges the pivot arm upward and a pedal plate 34128 extending rearwardly from the free end of the pivot arm can be used to depress the pivot arm when the latch is opened by means of latch handle 34112 against the urging of latch closure spring 34114. Jack rack 34104 has a bar like handle 34130 at the top to permit it to be pulled upward. This end of the jack is accessible protruding upward behind the vehicle, as in the previous embodiments. Continued jacking beyond the cart transport position raises the vehicle bumper VB and thus lifts the rear of the vehicle as before, for changing of tires and the like. As the jack raises the cart, equalizer arms 34198, extending to either side of the block 3496 contact the underside of the vehicle bumper and prevent the cart from tipping. A laterally extending plate 34200 attached beneath the block, in similar manner contacts the ground in the down-position and prevents block (hook) tipping.

The center of gravity of the load relative to the longitudinal centerline of the carrying vehicle is adjustable through appropriate setting of the paired flange journal along the length of the pivot arm.

Figures 36, 37:
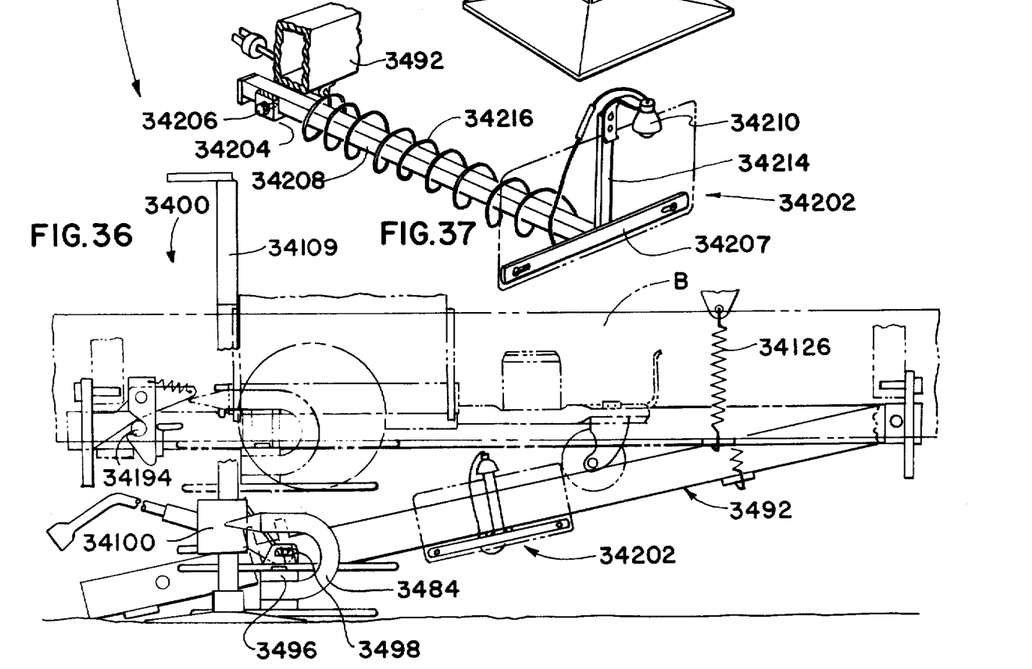
FIG. 36 is a rear elevation.
FIG. 37 is an isometric view.

FIG. 37 details the illuminated, adjustable license plate assembly 34202 shown also in FIG. 36. Clamp 34204 screws, or is welded to pivot arm 3492. When necessary to extend the vehicle license plate holder rearwardly to prevent obscuration by a cart being carried, clamp screw 34206 is loosened and the extension arm 34208 is pulled to the rear and reclamped, moving the license plate holder 34207 affixed at the end of the extension arm beneath the cart being transported to a position in full view from the rear. Lamp 34210 affixed above the license plate on the end of arm 34208 by transverse upward extension 34214 is uninterruptedly supplied with electricity from the vehicle in the usual manner, through line 34216 coiled about arm 34208 to prevent slack loops.

Figure 38:
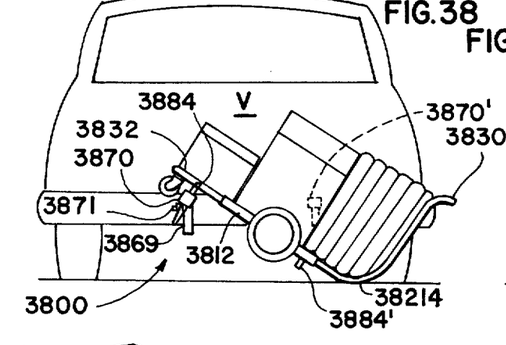
FIGS. 38 – 40 are rear elevational views.

FIGS. 38 – 46 detail aspects of further structure for loading and carrying a relatively lightweight cart (one which the average active human adult can lift half of without undue strain) onto the rear of a motor vehicle. In FIG. 38 a bumper-height, upward facing socket 3870 pivoted by a bolt 3871 to a bracket 3869 secured to the frame (not shown) of vehicle V receives a downwardly disposed, laterally protruding hook 3884 fixed to the cart forebody 3832 in an embodiment 3800 of the invention. The handle 3830 of the cart has a convex arcuate bend 38214 at the transition from the horizontal to the upward portions, so that downward pressure on the handle rocks the cart back on the bend and raises the front to engage the hook with the socket. Following this, the handle is raised and a second hook 3884', affixed to the rear of the midbody 3812 of the cart, is engaged with a second socket 3870', similar to the first socket and similarly attached to the frame of the vehicle.

Figure 39:
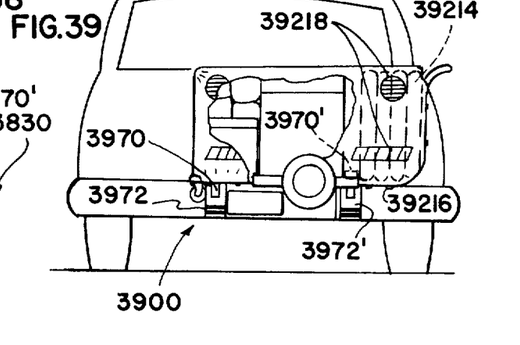

FIG. 39 shows a cart in the stowed-for-transport position in an embodiment 3900 similar to that of the previous Figure except that the respective sockets 3970, 3970' have clamps 3972, 3972' mounting them to the vehicle bumper VB, and socket 3972 is fixed and has an oversize opening rather than a pivotal arrangement. This embodiment (and the others) preferably has a fitted canvas transport cover 39214 attached by snaps 39216 and bearing safety reflectors 39218.

Figures 40, 41, 42, 43, 44, 45, 46:
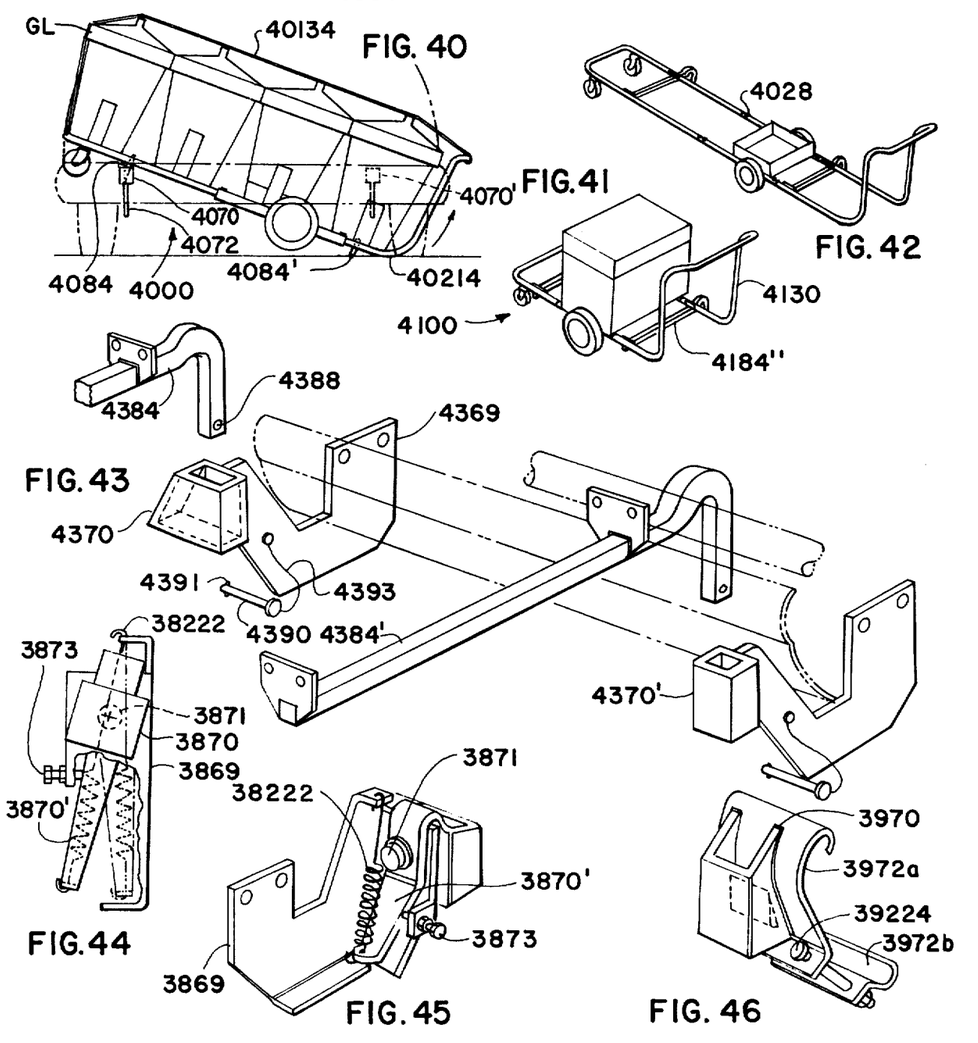
FIGS. 41 – 43 are isometric views.
FIG. 44 is a side elevation.
FIGS. 45 and 46 are isometric views.

FIG. 40 shows a garbage cart structure in embodiment 4000, rocked back on the handle bend 40214 to engage hook 4084 with fixed socket 4070. Flange 4072 supports the socket to the frame of the vehicle. The second hook 4084' is fixed to the handle and fits second socket 4070' spaced from the first socket and similarly mounted. A strap 40134 attached between the forebody and handle secures the garbage can lids GL for transport.

FIG. 41 illustrates details of an embodiment 4100 similar to that of FIG. 38 but with the shank 4184'' of the hook attached transversely across the handle 4130 instead of the midbody.

FIG. 42 is a detail of the FIG. 40 embodiment with overlying structure removed to show attachment of the hook structure at each end to one of the longitudinal members of the forebody and handle.

Spacing between the hooks is easily adjustable to match socket spacing by loosening clamp screws or set screws 4028 in this embodiment and sliding the forebody or handle with respect to the midbody. Analogous adjustments are possible and conveniently made in the other double-hook embodiments.

FIG. 43 details portions of the FIG. 40 structure showing relation of the hooks 4384, 4384' to the sockets 4370, 4370' supported by integral brackets 4369. Pins 4390 having end-detent plungers 4391 fit holes 4388 in the hooks to retain them in the sockets. Lines 4393 prevent loss of the pins. The hooks have perforate attachment flanges or other suitable means of affixing them to the cart portions.

FIGS. 44 and 45 show a pivotal socket 3870 as described in reference to FIG. 38. Spring 38222 tensioned between the top of the bracket 3869 and the lower end of pivot arm 3870' integral with the socket occupies an over-center relation with respect to socket pivot bolt 3871 at each of the stable positions of pivot shown. Screw 3873 threaded in the bracket adjusts the travel of the pivot arm, setting the socket upward aspect angle properly to receive the hook.

FIG. 46 details the fixed socket structure, 3970, FIG. 39, 3972a and 3972b being the clamp halves connected by bolts 39224.

It may be seen that many useful aspects of the invention appear from the foregoing. As noted, the unit is a space-maker for vehicles and users of all types can motor the unit to the area of use and push it to the exact site. The many features such as the canopies are easily interchanged among embodiments.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. A mobile caddy system having means for attachment for transport by a ground supported vehicle comprising, a mobile caddy having: a midbody, including a container, a pair of double-ended securances respectively affixed along respective lower sides of the container in parallel-spaced fore and aft alignment therewith, means for mobile support located proximate the midbody, a handle having engagement at the rear end of said double-ended securances, a forebody having engagement at the front end of said double securances with at least one forebody support affixed to the forebody; said vehicular attachment means including: means positioned laterally of the mobile caddy, means having a portion complementary in shape to the laterally positioned means for securing to a carrying vehicle, and said means for securing having ground contacting means thereon for lifting the mobile caddy into transport position.

2. A mobile caddy system as recited in claim 1, wherein said means for vehicular attachment ground contacting means includes a jack thereon, and wherein operation of said jack extends a portion down to the ground and thereafter lifts the mobile caddy into carrying position on said a vehicle.

3. A mobile caddy system as recited in claim 2, wherein continued operation of the jack past said carrying position lifting point continues the extension thereof lifting a portion of said a vehicle.

4. A mobile caddy system as recited in claim 2, wherein the handle engagement and the forebody engagement comprise tubular engagement with the double ended securances.

5. A mobile caddy system as recited in claim 4, wherein each double ended securance comprises a tube, and wherein the handle and the forebody respectively have portions fitting inside of the tube.

6. A mobile caddy system as recited in claim 5, wherein the tube has a uniform cross section lengthwise thereof, and wherein at least one of said portions fitting inside the tube has a uniform cross section lengthwise thereof adjustably telescoping within the tube.

7. A mobile caddy system as recited in claim 6, wherein all said handle and forebody respectively comprise U shaped members, and wherein the ends of the U shaped members comprise the portions adjustably telescoping within the tubes.

8. A mobile caddy system as recited in claim 5, wherein the container comprises a rectangular open-top pan having transverse front and rear walls, side walls and a bottom.

9. A mobile caddy system as recited in claim 8, wherein the means for mobile support include at least two members in spaced relation with a said member located outboard each tube, wherein the pan has an upper portion wider than the portion below and wherein the pan upper portion laterally overhangs each member outboard the tube.

10. A mobile caddy system as recited in claim 9, wherein the pan upper portion has detachably supported thereabove a box-shape portion.

11. A mobile caddy system as recited in claim 9, wherein the pan upper portion extends upwardly a distance comprising substantially the entire height of the midbody.

12. A mobile caddy system as recited in claim 4, wherein the laterally positioned means includes a first member longitudinally disposed with respect to the caddy and having a rectangular cross-section, and wherein the complementary shape portion of the means for securing includes a second member longitudinally disposed with respect to the caddy and having a rectangular cross-section.

13. A mobile caddy system as recited in claim 12, wherein one of said longitudinally disposed members is a hook and the other of said longitudinally disposed members is a socket adapted to receive the hook in a longitudinal direction.

14. A mobile caddy system as recited in claim 13, wherein the hook has a tapered end for engaging the socket, and means for removably retaining the hook in the socket.

15. A mobile caddy system as recited in claim 14, wherein the socket has a slot in the bottom thereof for passage there-through of a portion of the hook.

16. A mobile caddy system as recited in claim 14, wherein the socket has at least one flange and means for adjustably attaching the flange to one of said transverse walls of the pan.

17. A mobile caddy system as recited in claim 12, wherein the means for securing includes at least one arm having attachment at a first end thereof to one of said longitudinally disposed members and having a horizontal-pivot attachment at a second end for affixation to said a vehicle.

18. A mobile caddy system as recited in claim 17, wherein said jack is affixed to the arm proximate said first end.

19. A mobile caddy system as recited in claim 18, and means proximate the first end of the arm for latching onto a portion of said a vehicle, retaining the arm in upward position.

20. A mobile caddy system as recited in claim 19, wherein the arm is affixed transversely to said one of the longitudinally disposed members at said first end of the arm.

21. A mobile caddy system as recited in claim 19, wherein the arm is affixed substantially parallel to said one of the longitudinally disposed members at said first end of the arm.

22. A mobile caddy system as recited in claim 19, wherein are provided resilient means for resiliently urging the latch, and means for releasing the latch.

23. A mobile caddy system as recited in claim 19, wherein is provided means for resiliently urging the arm upward for latching, and means for holding the arm downward.

24. A mobile caddy system as recited in claim 4, wherein all said handle and forebody respectively include U shaped members, said tubular engagement including telescoping engagement of the ends thereof with the double-ended securances.

25. A mobile caddy system as recited in claim 24, wherein said forebody support includes a pair of downwardly disposed members laterally spaced at the forward end of the forebody.

26. A mobile caddy system as recited in claim 25, said downwardly disposed members being castors.

27. A mobile caddy system as recited in claim 25, said downwardly disposed members being tubular-foot continuations of said forebody U shape.

28. A mobile caddy system as recited in claim 25, said downwardly disposed members being corner-shape legs.

29. A mobile caddy system as recited in claim 24, said forebody including means for holding an item thereon.

30. A mobile caddy system as recited in claim 29, said means for holding comprising a rectangular open-top tray.

31. A mobile caddy system as recited in claim 29, said means for holding comprising a plurality of L shaped clips spaced around the perimeter of the forebody, one leg of each L shaped clip oriented upwardly, the other leg of each L shaped clip having a longitudinal slot therein, and means for adjustably securing the L shaped clip engaging the longitudinal slot.

32. A mobile caddy system as recited in claim 24, wherein the pan has a laterally overhanging upper portion having front, back and side walls extending upwardly, said upper portion having an open top, with a pair of leaves hinged at one end for lateral extension and storage downward along the side walls respectively, a horizontal partition dividing the pan into upper and lower portions, an opening in at least one side wall communicating with the lower portion, at least one rod vertically extensible above the pan, and a metal canopy supported by the rod, said canopy being of rectangular shape and size for fitting over the pan in storage as a top.

33. A mobile caddy system as recited in claim 32, wherein the handle extends back horizontally from the midbody and then upward, defining with the pan a storage rack.

34. A mobile caddy system as recited in claim 32, wherein the handle and forebody are proportioned for fitting against respective ends of the midbody in vertical relation thereto when detached for storage, and means for retaining the handle and forebody in the storage position.

35. A mobile caddy system as recited in claim 32, and a grill having folding feet spaced to rest on the horizontal partition in stabilizing contact with the front and rear walls thereof, the grill having a two-part grid, a plurality of plates having stepped notches therein supporting the grid parts whereby each grid part can be stepped upward or downward in parallel increments in successive sets of said notches.

36. A mobile caddy system as recited in claim 24, wherein the handle extends horizontally back from the midbody and then upward and wherein a container is held in the space between the handle and the midbody.

37. A mobile caddy system as recited in claim 24, wherein the pan has at least one drawer mounted through a vertical portion thereof.

38. A mobile caddy system as recited in claim 24, wherein the pan has a lid hinged thereto and means for supporting the lid in vertical hinged-position.

39. A mobile caddy system as recited in claim 24, wherein the handle extends diagonally upward from the midbody, and wherein at least one traction member is provided on the handle diagonal upward extension, said traction member having an endless belt with a portion thereof below the handle, and anti-friction means for mounting the endless belt.

40. A mobile caddy system as recited in claim 24, wherein the pan has a plurality of struts extending upwardly therefrom, wherein a tray is supported in spaced relation thereabove by the struts, wherein the tray has an aperture therein, and wherein a beverage container is provided within the pan with a portion extending upward through the aperture in the tray.

41. A mobile caddy system as recited in claim 24, wherein an elongate box-shaped body is provided extending from the handle forward over the midbody and forebody and having means for attachment to the caddy.

42. A mobile caddy system as recited in claim 41, wherein the elongate body has a plurality of sides forming a boxlike structure, and a hinged cover.

43. A mobile caddy system as recited in claim 24, wherein the forebody and midbody have a plurality of sets of upstanding clips and wherein a plurality of vertically elongate rectangular cans with lids is provided, each of said cans fitting within one said set of upstanding clips.

44. A mobile caddy system as recited in claim 24, wherein the midbody has a leaf extending rearwardly therefrom and wherein the leaf rests on the upper portion of the handle.

45. A mobile caddy system as recited in claim 24, wherein the means for vehicular attachment includes affixed thereto a license plate positioning assembly including a clamp, a rearwardly extendible arm held in the clamp, a license plate holder affixed at the end of the extension arm, a lamp assembly affixed at the license plate holder, and a wire attached to the lamp and coiled forwardly around the extension arm.

46. A mobile caddy system as recited in claim 1, wherein the means for mobile support include at least one wheel, at least one axle on the midbody for mounting the wheel, wherein the means for mobile support further includes at least one ski, wherein said forebody support and wheel have provisions for detachment from the caddy, and wherein the ski has at least one attachment thereon for securing the ski to the caddy in place of the wheel and forebody support.

47. A mobile caddy system as recited in claim 1, said mobile caddy having a first hook and a second hook projecting laterally and downwardly therefrom, comprising said means positioned laterally of the mobile caddy, the second hook rearwardly spaced from the first hook, the handle having an arcuate downwardly convex curve in a lower portion thereof comprising said ground contacting means; the means for securing comprising first and second sockets and means for attaching the first and second sockets to said a vehicle in locations laterally spaced and substantially equally high above the ground, thereby providing for the first hook to be engaged with the first socket on rocking the mobile caddy on the downwardly convex curve therein and for the second hook to be engaged with the second socket on raising said handle.

48. A mobile caddy system as recited in claim 47, wherein said forebody has longitudinal slidable engagement with the midbody and has the first hook affixed thereto, whereby the spacing between the hooks is adjustable on sliding said slidable engagement.

49. A mobile caddy system as recited in claim 48, wherein the second hook is affixed to the midbody.

50. A mobile caddy system as recited in claim 49, wherein the second hook is affixed to the handle, and the handle has longitudinal slidable engagement with the midbody.

51. A mobile caddy system as recited in claim 47, wherein the means for attaching comprises at least one bumper-clamp.

52. A mobile caddy system as recited in claim 47, wherein the first socket has a pivot member and a mounting bracket, the pivot member pivotally attaching the first socket to the mounting bracket.

53. A mobile caddy system as recited in claim 52, and a spring for biasing a portion of the first socket in over-center relation to the pivot member.

* * * * *